United States Patent
Schmidt et al.

(10) Patent No.: US 6,840,674 B2
(45) Date of Patent: Jan. 11, 2005

(54) METHOD OF DETERMINING THE QUANTITY OF RADIATION ABSORBED BY A RADIATION SENSOR

(75) Inventors: Ralf Schmidt, Aachen (DE); Kai Eck, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/297,346
(22) PCT Filed: Mar. 20, 2002
(86) PCT No.: PCT/IB02/00958
§ 371 (c)(1), (2), (4) Date: Nov. 21, 2002
(87) PCT Pub. No.: WO02/077667
PCT Pub. Date: Oct. 3, 2002

(65) Prior Publication Data
US 2003/0142792 A1 Jul. 31, 2003

(30) Foreign Application Priority Data
Mar. 23, 2001 (DE) .......................... 101 14 303

(51) Int. Cl.⁷ ............................................. G01D 18/00
(52) U.S. Cl. ..................... 378/207; 378/98.8; 250/252.1
(58) Field of Search ................................ 378/98.8, 207, 378/108, 51; 250/370.09, 252.1, 363.09

(56) References Cited

U.S. PATENT DOCUMENTS

| 4,544,843 A | * | 10/1985 | Kern et al. .................. 250/239 |
| 4,611,117 A |   | 9/1986  | Seibert |
| 6,021,173 A | * | 2/2000  | Brauers et al. ............ 378/98.8 |
| 6,181,773 B1 | * | 1/2001 | Lee et al. .................... 378/155 |
| 6,404,851 B1 | * | 6/2002 | Possin et al. ............... 378/98.7 |

FOREIGN PATENT DOCUMENTS

| EP | 0 387 799 | 9/1990 |
| WO | WO 00/29872 | 5/2000 |

* cited by examiner

Primary Examiner—David V. Bruce
Assistant Examiner—Irakli Kiknadze
(74) Attorney, Agent, or Firm—Wayne M. Serra

(57) ABSTRACT

The invention relates to a method for the calibration of a radiation sensor, in which method a first calibration takes place with external radiation x and an internal signal s of the radiation sensor, and in which later calibrations are carried out exclusively with the internal signal. This enables the calculation of an approximate value $x^*(t)$ for the quantity of radiation $x(t)$ absorbed in a radiation sensor (10) while taking into account a behavior of the radiation sensor that changes in time. First the primary characteristic $f_{t_1}(x)$ is measured at a first instant $t_1$; this characteristic describes the dependency of an output signal o on the absorbed quantity of radiation x. At the same time the secondary characteristic $g_{t_2}(s)$ is measured, which characteristic describes the dependency of the output signal o on an internal signal s. The signals s and x should together form an intermediate signal w that is further processed with a function $D(w,t)$ that varies in time in order to form the output signal o. The secondary characteristic is measured again at a later instant $t_3$ after the occurrence of aging; this measurement can be performed without utilizing (X) radiation. The calculation of the approximate value for the absorbed quantity of radiation can then be performed in conformity with the following formula:

$$x^*(t) := f_{t_1}^{-1}\big(g_{t_2}\big(g_{t_3}^{-1}(o(t))\big)\big).$$

10 Claims, 1 Drawing Sheet

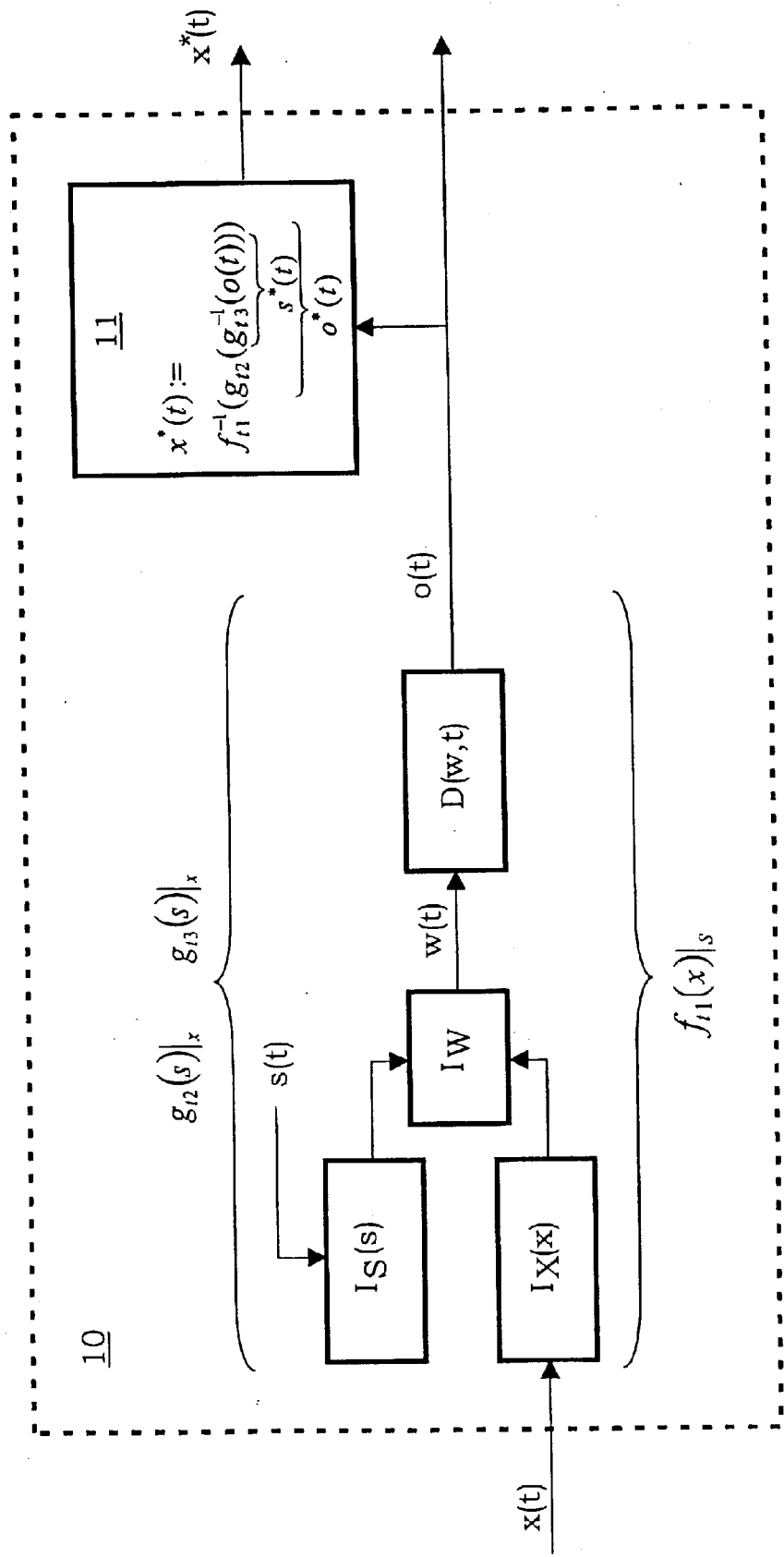

METHOD OF DETERMINING THE QUANTITY OF RADIATION ABSORBED BY A RADIATION SENSOR

BACKGROUND

The invention relates to a method of calibrating a radiation sensor in order to determine the quantity of radiation x(t) that is absorbed by the radiation sensor from the output signal o(t) of the radiation sensor at a given instant t. The invention also relates to a radiation sensor that is arranged so as to carry out a method of the kind set forth, and to an X-ray detector that includes a plurality of such radiation sensors.

Generally speaking, the function of radiation sensors consists in absorbing quanta of, for example, an electromagnetic radiation field so as to convert such quanta into a corresponding output signal such as an electric voltage or charge. When the functional relationship between the output signal and the input signal, that is, the absorbed amount of radiation, is known, the magnitude of the input signal can be deduced from the output signal. Said relationship (conversion characteristic) is typically determined with the aid of a calibration measurement during which known quantities of radiation x(t) are absorbed and the resultant output signals o(t) are measured. A characteristic that constitutes the desired conversion characteristic can be derived from the pairs of values thus obtained.

However, a problem is encountered in that the conversion characteristic of a radiation source generally is not constant but varies as a function of time under the influence of drift phenomena and aging phenomena of the components of the radiation sensor. For example, in the case of a flat dynamic X-ray detector (FDXD) the hardware of the detector induces differences and non-linearities in the neighboring pixels, rows and blocks, which differences and non-linearities become manifest as visible image artifacts. In order to eliminate such differences, calibration with X-rays in many different doses is required as described above. Because of the variation in time of the characteristic of the FDXD detector, such calibrations must be repeated at given time intervals so as to ensure that the desired measuring accuracy is continuously maintained. Such a method for the repeated calibration of an X-ray detector is described, for example in JP-09-018245. The frequent recalibration, however, has the drawback that X-rays that represent a radiation load for staff and equipment must be employed without medical necessity.

SUMMARY OF THE INVENTION

Considering the foregoing it is an object of the present invention to provide a method and a radiation sensor that enable exact as possible calibration and hence calculation of the absorbed amount of radiation from the measured output signal while utilizing fewer means and while taking into account characteristics that vary as a function of time.

This object is achieved by means of a method as disclosed in the characterizing part of claim 1, by means of a radiation sensor as disclosed in the characterizing part of claim 6, as well as by means of an X-ray detector as disclosed in the characterizing part of claim 9. Advantageous further embodiments of the invention are disclosed in the dependent claims.

Therefore, a method is proposed for the calibration of a radiation sensor, in which method a first calibration is carried out with external radiation x and an internal signal s of the radiation sensor, later calibrations being performed exclusively by means of the internal signal. The internal signal s is preferably a signal which exhibits an overlap of the processing path with the external radiation x, so that the calibrations measured later in respect of the internal signal can provide information on the calibrations in respect of the external signal which have not been measured anew.

Consequently, a method of this kind allows for calibrations to be repeated at given time intervals so as to ensure the desired measuring accuracy continuously, and to base the calibration on the conversion characteristic of the radiation sensor which varies in time due to drift phenomena and aging effects of the components. As opposed to the state of the art, however, it is not necessary to utilize external radiation. This is advantageous notably in conjunction with radiation detectors for X-rays, for example, detectors of the type FDXD, where on the one hand temporal variations of the conversion characteristic cause a noticeable degradation of the image quality, while on the other hand the use of external radiation always represents an undesirable burden to staff and equipment.

Preferably, the method is used in conjunction with radiation sensors for X-rays. The internal signal s can then be generated, for example by the so-called reset light. Reset light involves a matrix of photodiodes LED that are arranged behind the radiation sensors (photodiodes) on the side that is remote from the X-rays. The measuring protocol of the X-ray detector induces short light pulses that serve to illuminate the radiation sensors (photodiodes) in preparation of the actual measurement. The "light dose", and hence the magnitude of the internal signal s, can be varied by way of the length of these light pulses.

Another possibility for impressing an internal signal s in the form of a light dose may consist in coupling light laterally into a light conducting plate as in the case of LCD displays, said light being coupled out again after distribution across the surface of the radiation sensors.

Furthermore, an internal signal s can also be generated while using charge pumps. Charge pumps apply a quantity of charge that is defined by a variable voltage to the input leads of the charge amplifiers that are used for reading out the radiation sensors (photodiodes). Charge pumps of this kind are typically integrated in the chips of the charge amplifier circuit.

In a further embodiment additional, preferably external inputs of the charge amplifiers can be made available so as to apply electrical test signals s thereto.

Furthermore, numerous other possibilities exist for the generating of internal signals s, for example, by way of ultraviolet light or by utilizing DA converters.

In accordance with a further version of the method the calibration is used to determine the amount of radiation x(t) that is absorbed by a radiation sensor from the output signal o(t) of the radiation sensor at a given instant t, the following steps then being carried out:

measuring a so-called primary characteristic $f_{r1}(x)$ of the radiation sensor at a first instant $t_1$, which primary characteristic describes the dependency of the output signal $o=f_{r1}(x)$ on the absorbed quantity of radiation x (first calibration with external radiation);

measuring the so-called secondary characteristic $g_{r2}(s)$ or $g_{r3}(s)$ of the radiation sensor at a second instant $t_2$ (first calibration with an internal signal) and at least a third instant $t_3$ (later calibration with the internal signal), which secondary characteristic is intended to describe the dependency of the output signal o on an internal signal s of the radiation sensor, said internal signal s and the absorbed quantity of radiation x together being intended to form an intermediate quantity w on which the output signal o is dependent, and said instants being intended to be arranged in the sequence $$t_1 \leq t_2 < t_3 \leq t$$

determining an approximate value x*(t) of the desired absorbed quantity of radiation x(t) at the given instant t in conformity with the formula:

$$x^*(t) := f_{t_1}^{-1}\left(g_{t_2}\left(g_{t_3}^{-1}(o(t))\right)\right)$$

According to the described method, therefore, first the primary characteristic of the radiation sensor is determined as the (monotonous) function $f_{t_1}$ at a first instant $t_1$. This operation is carried out typically by application of known radiation doses of different value and by measuring the output signal $o = f_{t_1}(x)$ formed therefrom. The distribution of the radiation levels applied so as to determine the primary characteristic can be adapted in conformity with the desired accuracy of the determination of the characteristic $f_{t_1}$. This step is the "first calibration with external radiation".

Subsequently, the secondary characteristic $g_{t_2}$ of the radiation sensor is measured, which secondary characteristic describes the dependency of the output signal o on an internal signal s of the radiation sensor at the instant $t_2$. This step represents the "first calibration with an internal signal". The internal signal s of the radiation sensor is advantageously a signal whose magnitude can be readily determined and/or be preset from the outside. Furthermore, it should be an internal signal s that merges with the quantity of radiation x absorbed, or with a signal derived therefrom, so as to form an intermediate signal w which is converted into the output signal o by further processing stages of the radiation sensor. Preferably, the first measurement of the secondary characteristic is performed in parallel or simultaneously with the measurement of the primary characteristic, meaning that the first instant is the same as the second instant: $t_1 = t_2$.

Subject to the above conditions, the secondary characteristic g implicitly comprises the further processing stage for the intermediate signal w. Time dependencies of this further processing stage that are due to drift or aging phenomena thus become manifest in the secondary characteristic. Because on the other hand the primary characteristic also implicitly comprises the further processing stage for the signal w, the time dependency of the primary characteristic can be derived from the time dependency determined for the secondary characteristic. Such time dependency information is exact and not only approximately feasible when the time dependency of the primary characteristic and the secondary characteristic is due exclusively to the time dependency of the further processing stage for the signal w.

Instead of measuring the primary characteristic f anew after a given period of time has elapsed, in conformity with the method of the invention the secondary characteristic is measured anew at the instant $t_3$ (this corresponds to the "later calibration with the internal signal); this operation is simpler and can be performed in particular without utilizing external radiation of different doses. Should the quantity of absorbed radiation x(t) be defined from an output signal o(t) at an instant $t \geq t_3$ after this second (or generally $n^{th}$) new measurement of the secondary characteristic, in conformity with the above formula the inverse of the second measurement of the secondary characteristic, being $g_{t_3}^{-1}$, can first be used to calculate the corresponding internal signal $s^*(t) = g_{t_3}^{-1}(o(t))$ from the instantaneous output signal o(t). Because only a small period of time should elapse between the last updating of the secondary characteristic at the instant $t_3$ and the current instant t, the secondary characteristic $g_{t_3}$ still constitutes a suitable approximation of the actual secondary characteristic at the instant t.

Using the secondary characteristic $g_{t_2}$ of the instant $t_2$, it is then calculated, on the basis of the calculated internal signal s*(t), which fictitious output signal $o^*(t) = g_{t_2}(s^*(t))$ would have corresponded to said internal signal s*(t) at the instant $t_2$. Finally, in conformity with the above formula and using the inverse value $f_{t_1}^{-1}$ of the primary characteristic of the instant $t_1$ it is calculated, on the basis of the fictitious output signal o*(t), which absorbed quantity of radiation $x^*(t) = f_{t_1}^{-1}(o^*(t))$ corresponds to such a fictitious output signal; this value then represents the desired approximate value for the quantity of radiation absorbed at the instant t.

Because the recalibration of the secondary characteristic can be performed while employing fewer means and without application of external radiation, it can be performed at comparatively short time intervals, thus ensuring that drift phenomena of the characteristics are taken up with a high resolution. A high degree of measuring accuracy of the radiation sensor can thus be ensured also for prolonged periods of time.

The invention also relates to a radiation sensor for generating an output signal o(t) that is dependent on the absorbed quantity of radiation x(t) at a given instant t, which sensor includes an evaluation unit that is arranged in such a manner that it is capable of carrying out a method of the kind set forth. This means that the evaluation unit enables a calibration of the radiation sensor where a first common calibration takes place with external radiation x and an internal signal s of the radiation sensor, and where later calibrations are carried only with the internal signal.

The evaluation unit may be arranged especially to calculate an approximate value x*(t) for the absorbed quantity of radiation x(t) from the output signal o(t). This means that the evaluation unit is notably capable of carrying out each time a first measurement of the primary characteristic f and the secondary characteristic g, carrying out new measurements of the secondary characteristic g when necessary at later instants, and calculating the desired approximate value x*(t) from the last measurement of the secondary characteristic as well as the first measurements of the primary characteristic and the secondary characteristic.

Furthermore, as a condition for carrying out the method the radiation sensor is structured in such a manner that it comprises an internal signal s that is accessible to the evaluation unit, that is, a signal that can be influenced and/or measured, the internal signal s and a signal that is dependent on the absorbed quantity of radiation x being merged so as to form an intermediate signal w.

The radiation sensor is preferably a sensor for X-rays. In the case of such sensors it is particularly advantageous when the deployment of additional X-rays can be dispensed with for a recalibration or continuous readjustment of the calibration.

The radiation sensor for X-rays is preferably arranged in such a manner that it converts the absorbed X-rays either indirectly or directly into an electric signal. In the case of "indirect conversion", the X-rays are first converted into visible light in a scintillator; this light is converted into an electric signal via photodiodes. In the case of "direct conversion" sensors, however, direct conversion of the X-rays into an electric signal takes place. In this case a short signal path exists between the absorption of the X-rays and an intermediate signal w of the described kind, so that the proposed method provides a particularly good approximation.

The invention also relates to an X-ray detector for the detection of X-rays, which detector is characterized in that it includes a plurality of radiation sensors of the kind set forth. Such radiation sensors may notably be arranged in the form of a matrix so as to form a field. The X-ray detector may notably be one of the flat dynamic X-ray detectors (FDXD) that are used for medical fluoroscopy methods.

BRIEF DESCRIPTION OF THE DRAWINGS

The invention will be described in detail hereinafter, by way of example, with reference to a FIGURE. The FIGURE shows diagrammatically the components of a radiation sensor 10 that is arranged to carry out the method in accordance with the invention.

DETAILED DESCRIPTION

The radiation sensor 10 is a sensor element of an FDXD detector that serves for the detection of the quantity x(t) of absorbed X-rays. The following embodiments, however, can be used equally well for other electromagnetic types of radiation or for non-electromagnetic radiation (for example, phonons).

The basic function of the radiation sensor 10 is to convert the absorbed quantity of radiation x(t) into an output signal o(t). The relationship between the output signal o and the absorbed quantity of radiation x is described by the so-called primary characteristic f. This primary characteristic changes in the course of time as a result of aging and drift phenomena of the components; this is denoted by a time index for the characteristic: $f_t$.

Furthermore, in conformity with the structure of the radiation sensor 10 as shown in the FIGURE the output signal o(t) is also dependent on an internal signal s(t). This internal signal may concern, for example, one of the following signals:

- the illumination of the photodiodes of the radiation sensor 10 by way of a LED matrix (reset light);
- the illumination of the photodiodes of the radiation sensor 10 by way of other light sources that may possibly be provided specifically for generating the internal signal;
- the quantities of charge that are impressed on the input leads of the amplifiers by charge pumps;
- internal electrical signals on additional inputs of the charge amplifiers;
- external electrical signals on additional inputs of the charge amplifiers.

The dependency of the primary characteristic on such an internal signal s can be symbolized by a further index s: $f_t(x)|s$.

The dependency between the output signal o and the internal signal s for a given absorbed quantity of radiation x is described by the so-called secondary characteristic g that is provided with two indices because of its time dependency and the dependency on x: $g_t(s)|x$.

In conformity with the internal structure of the radiation sensor 10 the absorbed quantity of radiation x(t), after conversion in conformity with a function $I_X$, and the internal signal s(t), after conversion in conformity with a function $I_S$, are merged to an intermediate signal w(t) by a functional relationship $I_W$. This intermediate signal w(t) is then further processed so as to form the output signal o(t) in conformity with a function D(w,t).

The latter further processing function D(w,t) comprises an explicit time dependency whereby aging and drift phenomena of the associated components are taken into account. The method that is explained hereinafter is based on the assumption that the time dependencies of the primary characteristic $f_t$ and the secondary characteristic $g_t$ are caused at least approximately exclusively by the time dependency of the further processing function D(w,t). This is because in that case the time dependency of the further processing function D(w,t) can be determined by measurement of the secondary characteristic $g_t$ and to adapt the primary characteristic $f_t$ on the basis thereof to the changes in time without repeating their measurement.

In order to carry out the proposed method, the radiation sensor 10 includes an evaluation unit 11 which calculates an approximate value x*(t) for the absorbed quantity of radiation from the output signal o(t). The detailed execution of the method is as follows.

First the primary characteristic $f_{t1}$ is determined at an instant $t_1$ in a series of X-ray exposures while using different doses, the internal signal s being kept constant or being also detected. In as far as the radiation sensor 10 is only one element (pixel) of an X-ray detector that consists of numerous radiation sensors, the characteristic for each pixel, or the mean characteristic of columns or detector regions, is determined by homogeneous X-ray exposures. The number of different X-ray doses used can be defined in dependence on the smoothness of the resultant relation between the X-ray dose and the output signal o. Furthermore (not shown in the FIGURE), each pixel characteristic can be mapped on an overall detector characteristic that may notably concern a linear relation between the dose and the output signal. Such a procedure enables complete linearization of the detector that is limited only by noise and by the accuracy of the absorbed quantity of radiation and the detector components.

Furthermore, the secondary characteristic $g_{t2}$ is determined at a second instant $t_2$ that is preferably the same as the instant $t_1(t_1=t_2)$.

As long as the further processing function D(w,t) does not change appreciably due to aging phenomena or the like, the primary characteristic $f_{t1}$ remains valid. Because a monotonous function of x is concerned, its inverse $f_{t1}^{-1}$ can be calculated. The use of this inverse value enables calculation of the associated absorbed quantity of radiation x(t) from an output signal o(t). This simple arithmetical operation, however, leads to unacceptable errors when the further processing function D(w,t) changes beyond a given extent due to aging phenomena or the like. In order to compensate such time dependencies, according to the present state of the art the primary characteristic $f_t$ is determined anew by means of an intricate method that utilizes renewed application of X-rays in different doses.

The proposed method, however, can be performed without such a renewed explicit measurement of the primary characteristic $f_t$. This is because instead of the primary characteristic the secondary characteristic $g_{t3}$ is determined again at an instant $t_3$, that is, at least once after a given period of time has elapsed since it was measured last; from a measuring technical point of view this operation can be more readily carried out and also without using X-rays. Because the secondary characteristic $g_{t3}$ implicitly comprises the further processing function D(w,t), it also provides information as regards changes of this function. This information can be used to convert an instantaneous output value o(t) into a fictitious output value o*(t) which would have occurred in the absence of aging phenomena, that is, at the instant $t_1$. The initially determined primary characteristic $f_{t1}$ can be applied to such a fictitious output value in order to calculate the approximate value x* for the absorbed quantity of X-rays. Mathematically speaking this leads to the following formula for the calculation of the approximate value x*:

$$x^*(t) := f_{t_1}^{-1}\left(g_{t_2}\left(g_{t_3}^{-1}(o(t))\right)\right)$$

As has already been stated, the method in accordance with the invention can also be used for X-ray detectors that consist of a plurality of radiation sensors 10 that are arranged, for example, in the form of a matrix. In this case the functions described above are extended by the indices m and n that stand for the row m and the column n of the relevant pixel in the detector field, for example:

$$o(t,m,n)=f_t(x(t),m,n)|_{s(t)}=g_t(s(t),m,n)|_{x(t)},$$

or vectorially expressed:

$$\underline{o}(t)=\underline{f}_t(\underline{x}(t))|_{\underline{s}(t)}=\underline{g}_t(\underline{s}(t))|_{\underline{x}(t)}.$$

The overall detector can be linearized by mapping the pixel characteristics on a common linear characteristic in conformity with the matrix $\underline{G}_c$:

$$\underline{o}_C=\underline{G}_c\underline{x}$$

This is performed by using the measured non-linear primary characteristic:

$$\underline{o}_C=\underline{G}_c\underline{f}_t^{-1}(\underline{o}(t))$$

The above formula for calculating an approximate value x* for the absorbed X-rays can then be used as follows in the context of the linearization:

$$\underline{o}_C = \underline{G}_C \underline{f}_{t_1}^{-1}\left(\underline{g}_{t_2}\left(\underline{g}_{t_3}^{-1}(\underline{o}(t))\right)\right)$$

Every measured output value $\underline{o}$ is then transformed into the output value $\underline{o}_C$ that corresponds to the common linear characteristic. This transformation eliminates non-linearities and differences between pixel characteristics that occur due to changes in the detector components. It is now only necessary to update the measurement of the secondary characteristic of the internal signal.

What is claimed is:

1. A method of calibrating a radiation sensor, in which method a first calibration is carried out with external radiation x and an internal signal s of the radiation sensor, and in which later calibrations are carried out exclusively with the internal signal.

2. A method as claimed in claim 1, wherein the radiation sensor is sensitive to X-rays.

3. A method as claimed in claim 1, wherein the internal signal s is formed by an externally selectable auxiliary illumination, notably by a reset light in the case of an X-ray sensor, by charge pumps of charge-sensitive amplifiers and/or by electric signals on internal or external additional inputs of amplifiers.

4. A method as claimed in claim 1, in which the calibration of the radiation sensor is used to determine the quantity of radiation x(t) that is absorbed by the radiation sensor from the output signal o(t) of the radiation sensor at a given instant t, which method includes the steps of:

measuring the primary characteristic $f_{t_1}(x)$ of the radiation sensor at a first instant $t_1$, which primary characteristic describes the dependency of the output signal o on the absorbed quantity of radiation x;

measuring the secondary characteristic $g_{t_2}(s)$, $g_{t_3}(s)$ of the radiation sensor at a second instant $t_2$ and at least a third instant $t_3$, which secondary characteristic describes the dependency of the output signal o on an internal signal s of the radiation sensor, the internal signal and the absorbed quantity of radiation x together forming an intermediate quantity w on which the output signal o is dependent and said instants being arranged as $t_1 \leq t_2 \leq t_3 \leq t$;

determining an approximate value x*(t) of the searched absorbed quantity of radiation x(t) at the given instant t in conformity with the formula $$x^*(t) := f_{t_1}^{-1}\left(g_{t_2}\left(g_{t_3}^{-1}(o(t))\right)\right).$$

5. A method as claimed in claim 4, wherein the first and the second instant are the same: $t_1=t_2$.

6. A radiation sensor for generating an output signal o(t) that is dependent on the absorbed quantity of radiation x(t) at a given instant t, which sensor includes an evaluation unit that is arranged in such a manner that it enables a calibration of the radiation sensor where a first calibration takes place with external radiation x and an internal signal s of the radiation sensor, and where later calibrations are carried out exclusively with the internal signal.

7. A radiation sensor as claimed in claim 6, wherein it is sensitive to X-rays.

8. A radiation sensor as claimed in claim 6, wherein it is arranged in such a manner that it converts absorbed X-rays directly or indirectly into an electric signal.

9. An X-ray detector for the detection of X-rays, wherein it includes a plurality of radiation sensors as claimed in claim 6.

10. An X-ray detector as claimed in claim 9, wherein the radiation sensors are arranged in the form of a matrix.

* * * * *